(12) United States Patent
Harada et al.

(10) Patent No.: US 8,706,045 B2
(45) Date of Patent: Apr. 22, 2014

(54) SIGNAL DETECTION APPARATUS AND SIGNAL DETECTION METHOD

(75) Inventors: Hiroki Harada, Yokosuka (JP); Hiromasa Fujii, Yokosuka (JP); Shunji Miura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 162 days.

(21) Appl. No.: 13/272,573

(22) Filed: Oct. 13, 2011

(65) Prior Publication Data

US 2012/0094618 A1 Apr. 19, 2012

(30) Foreign Application Priority Data

Oct. 19, 2010 (JP) .................................. 2010-234676

(51) Int. Cl.
*H04B 17/00* (2006.01)
(52) U.S. Cl.
USPC ........................ 455/67.11; 455/63.1; 455/84
(58) Field of Classification Search
USPC ................... 455/63.1, 67.11, 84, 226.1, 296
See application file for complete search history.

(56) References Cited

U.S. PATENT DOCUMENTS

| 7,616,554 B2 | 11/2009 | Asai et al. |
| 2008/0026704 A1 | 1/2008 | Maeda et al. |

FOREIGN PATENT DOCUMENTS

| JP | 2006-222665 | 8/2006 |
| JP | 2008-61214 | 3/2008 |

OTHER PUBLICATIONS

Cyclostationarity-Based Methods for the Extraction of the channel Allocation Information in a spectrum Pooling System, IEEE 2004, pp. 279 to 282.*

"Information technology—Telecommunications and information exchange between systems—Local and metropolitan area networks—Specific requirements—", Part 11: Wireles LAN Medium Access Control (MAC) and Physical Layer (PHY) Specifications, ANSI/IEEE Std 802. Nov. 1999 Edition, 528 pages.

(Continued)

*Primary Examiner* — Tuan H Nguyen
(74) *Attorney, Agent, or Firm* — Oblon, Spivak, McClelland, Maier & Neustadt, L.L.P.

(57) ABSTRACT

A signal detection apparatus includes: a unit configured to select a particular detection target signal from among plural candidates of detection target signals; a unit configured to calculate a cyclic autocorrelation value at a center coordinate point specified by at least a cyclic parameter and a shift parameter of the particular detection target signal; a unit configured to calculate a cyclic autocorrelation value of each of (L−1) coordinate points belonging to a common area that is used commonly for different detection target signals; a unit configured to calculate a test statistic of the particular detection target signal; and a unit configured to determine presence or absence of the particular detection target signal according to a comparison result between the test statistic and a threshold, wherein the test statistic is calculated by using the cyclic autocorrelation value in each of the (L−1) coordinate points belonging to the common area.

6 Claims, 14 Drawing Sheets

(56) References Cited

OTHER PUBLICATIONS

Amod V. Dandawaté, et al., "Statistical Tests for Presence of Cyclostationarity", IEEE Transactions on Signal Processing, vol. 42, No. 9, Sep. 1994, pp. 2355-2369.

"Draft Standard for Wireless Regional Area Networks Part 22: Cognitive Wireless RAN Medium Access Control (MAC) and Physical Layer (PHY) specifications: Policies and procedures for operation in the TV Bands", IEEE P802.22™/D0.2, Nov. 2006, 313 pages.

Harada, Hiroki, et al., "Iterative Cyclostationarity-Based Feature Detection of Multiple Primary Signals for Spectrum Sharing Scenarios", New Frontiers in Dynamic Spectrum, 2010 IEEE Symposium On, IEEE, Piscataway, NJ, USA, Apr. 6, 2010, pp. 1-8, XP031664862, ISBN: 9978-1-4244-5189-0.

Extended Europea
n Search Report mailed Dec. 5, 2013, in counterpart European Appln No. 11 185 415.4 (7 pages).

* cited by examiner

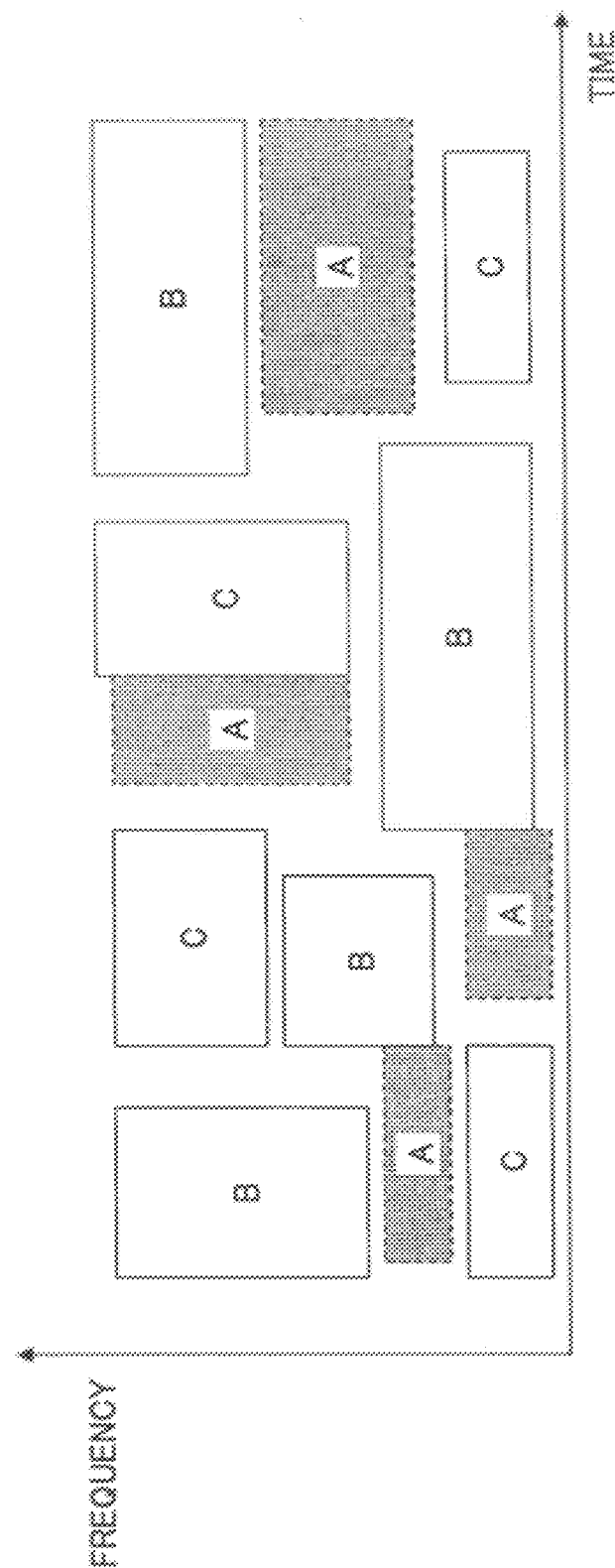

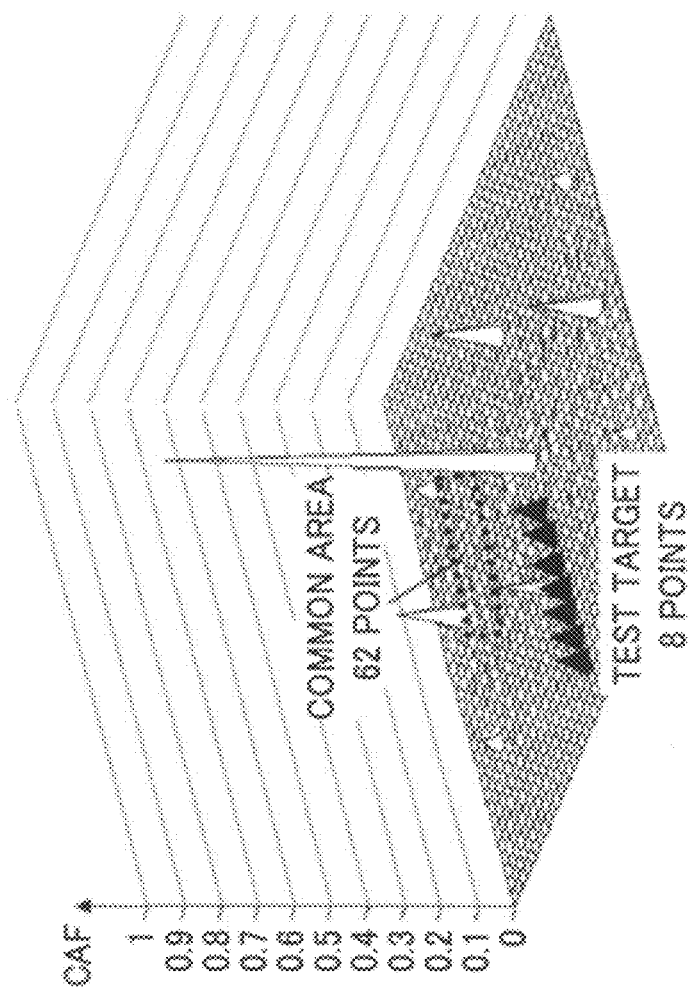

SIGNAL DETECTION APPARATUS AND SIGNAL DETECTION METHOD

BACKGROUND OF THE INVENTION

1. Field of the Invention

The present invention relates to a signal detection apparatus and a signal detection method in a radio station in an environment in which plural radio systems share the same frequency band.

2. Description of the Related Art

In many cases in the current radio communications, a specific frequency band is assigned to each radio communication system in order to avoid mutual interference. However, in recent years, in order to efficiently utilize limited frequency resources in radio communications, a method is being studied for using the same frequency band in plural communication systems. A cognitive radio technique is known as a technique for allowing plural radio systems to coexist in the same frequency band. According to this technique, radio environment is recognized so that communication is performed by setting transmission parameters such as a center frequency, a signal bandwidth, beam pattern and the like based on the recognition result and a rule for sharing frequencies and the like. Especially, in the environment in which plural radio systems share a frequency, it is necessary that each cognitive radio apparatus recognizes use status of radio resources before starting transmission as accurately as possible in order to improve frequency use efficiency while avoiding interference to the primary system and avoiding inference between cognitive systems.

As known techniques for recognizing a signal, there are power detection, matched filter detection, feature detection and the like. As a representative example for using signal reception level, the CSMA/CA (Carrier Sense Multiple Access with Collision Avoidance) scheme is known. For example, this technique is described in Part 11: Wireless LAN Medium Access Control (MAC) and Physical Layer(PHY) specifications, ANSI/IEEE Std 802.11, 1999 Edition (to be referred to as non-patent document 1). The wireless LAN system represented as the IEEE802.11 standard uses the CSMA/CA scheme, so that the wireless LAN system determines availability of data transmission by measuring reception level before performing data transmission. In addition, in techniques disclosed in Japanese Laid-Open Paten Application No. 2006-222665 (to be referred to as patent document 1) and A. V. Dandawate and G. B. Giannakis, "Statistical tests for presence of cyclostationarity," IEEE Trans. Signal Processing, vol. 42, no. 9, September 1994 (to be referred to as non-patent document 2), presence or absence of a signal is determined by calculating a feature amount of cyclostationarity of the signal, and each radio station performs transmission only when a signal is not detected in order to avoid interference. Such feature detection is a technique using statistical characteristics of the signal, and there are advantages in that advance information such as bandwidth and frame format and the like is not necessary and that synchronization of time and frequency is not necessary.

By using these techniques, even when different radio communication systems share the same frequency band, a radio station can detect presence of a signal used in the environment so that the radio station can transmit a signal when it is determined that interference does not occur.

In the CSMA/CA scheme described in the non-patent document 1, since presence or absence of a signal is determined based only on received power, it is unknown that the detected signal is what signal. Also, in the signal detection by using the matched filter, it is necessary to prepare a template of a signal to be detected in a receiver, and that the feature of the detection target signal is completely known. Therefore, if the feature is unknown, there is a problem in that even when a radio resource is available, the radio resource cannot be used.

On the other hand, as shown in the non-patent document 2, in the feature detection utilizing the statistical characteristics of the signal, it is possible to detect respective signals having different features based on small amount of advance information. But, there is a problem in that calculation load required for signal detection becomes very heavy as the number of types of detection target signals increases. In addition, there is a problem in that, when reception levels are different for different types of signals in the receiver, the feature of a weak signal is buried in the feature of a strong signal, so that detection rate of a weak signal is substantially lowered.

SUMMARY OF THE INVENTION

An object of the present invention is to easily detect plural detection target signals in the same frequency band.

According to an embodiment of the present invention, a signal detection apparatus is provided. The signal detection apparatus includes:

a detection target candidate selection unit configured to select a particular detection target signal from among plural candidates of detection target signals that are possibly included in a received signal;

a candidate signal calculation unit configured to calculate a cyclic autocorrelation value at a center coordinate point specified by at least a cyclic parameter and a shift parameter of the particular detection target signal;

a common area calculation unit configured to calculate a cyclic autocorrelation value of each of (L−1) coordinate points belonging to a common area that is used commonly for different detection target signals;

a test statistic calculation unit configured to calculate a test statistic of the particular detection target signal; and a signal determination unit configured to determine presence or absence of the particular detection target signal according to a comparison result between the test statistic and a threshold, wherein the test statistic calculation unit calculates the test statistic by using the cyclic autocorrelation value in each of the (L−1) coordinate points belonging to the common area as cyclic autocorrelation values in (L−1) coordinate points different from the center coordinate point in an area including the center coordinate point.

According to an embodiment of the present invention, it becomes possible to easily detect plural detection target signals in the same frequency band.

BRIEF DESCRIPTION OF THE DRAWINGS

FIGS. 1A and 1B are diagrams showing a frequency sharing environment in which plural radio stations that share the same frequency band perform communication;

FIGS. 11A and 11B are diagrams showing simulation results; and

DESCRIPTION OF THE PREFERRED EMBODIMENTS

Figure 1A:
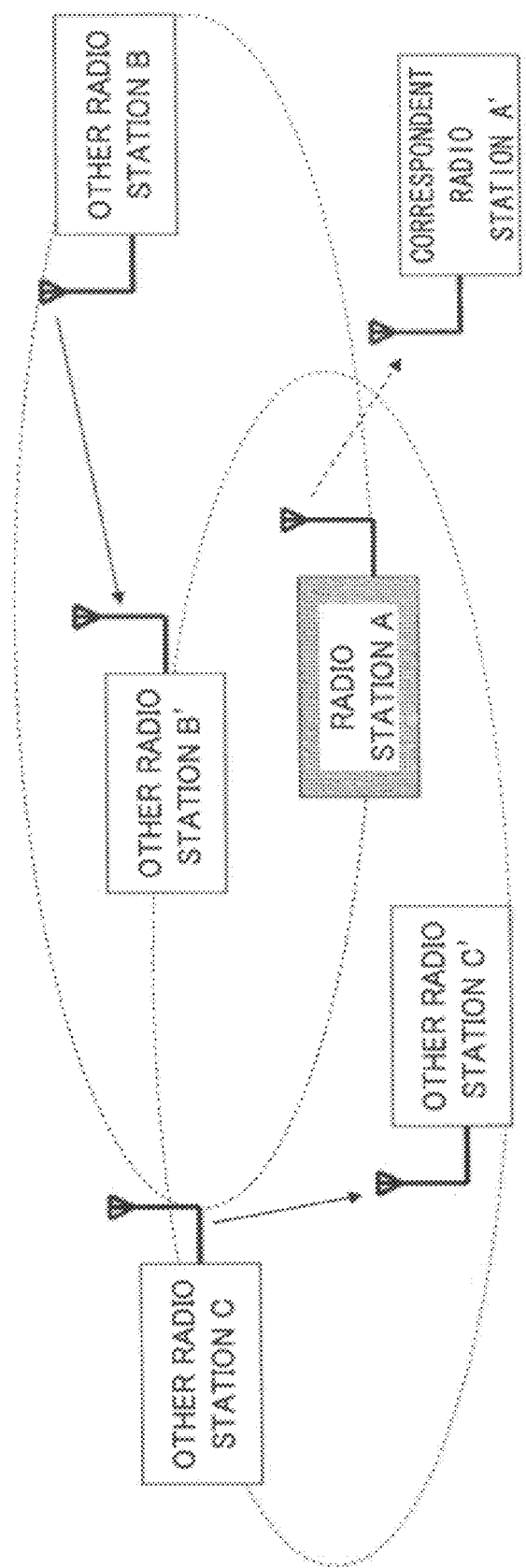

Next, an embodiment of the present invention is described based on the following aspects.
1. System
2. Radio station
3. Waveform feature amount
4. Principle of invention
5. Signal detection apparatus
6. Operation example
7. Modified example
8. Effect of embodiment
8.1 Effect of reduction of calculation load
8.2 Effect of improvement of weak signal detection rate
[Embodiment 1]
<1. System>

FIGS. 1A and 1B show a frequency sharing environment by plural radio stations. The radio stations A, B and C may belong to the same system, or may belong to different systems. In either case, each radio station performs radio communication utilizing a frequency belonging to the same frequency band. For example, the radio station A is trying to start communication with a correspondent radio station A'. At this time, the other radio stations B and C may be communicating with other radio stations B' and C' respectively. In order to avoid interference between radio stations that share the same frequency band, each of the radio stations A and A' needs to use a frequency that the other radio stations are not using. The radio station A determines presence or absence of a signal (detection target signal) of the other radio stations B and C by the after-mentioned signal detection apparatus, and performs radio communication using resources (time, frequency, place and the like) that are not used by these signals. Accordingly, by dynamically controlling resource assignment according to communication status, use efficiency of resources can be improved.

<2. Radio Station>

Figure 2:
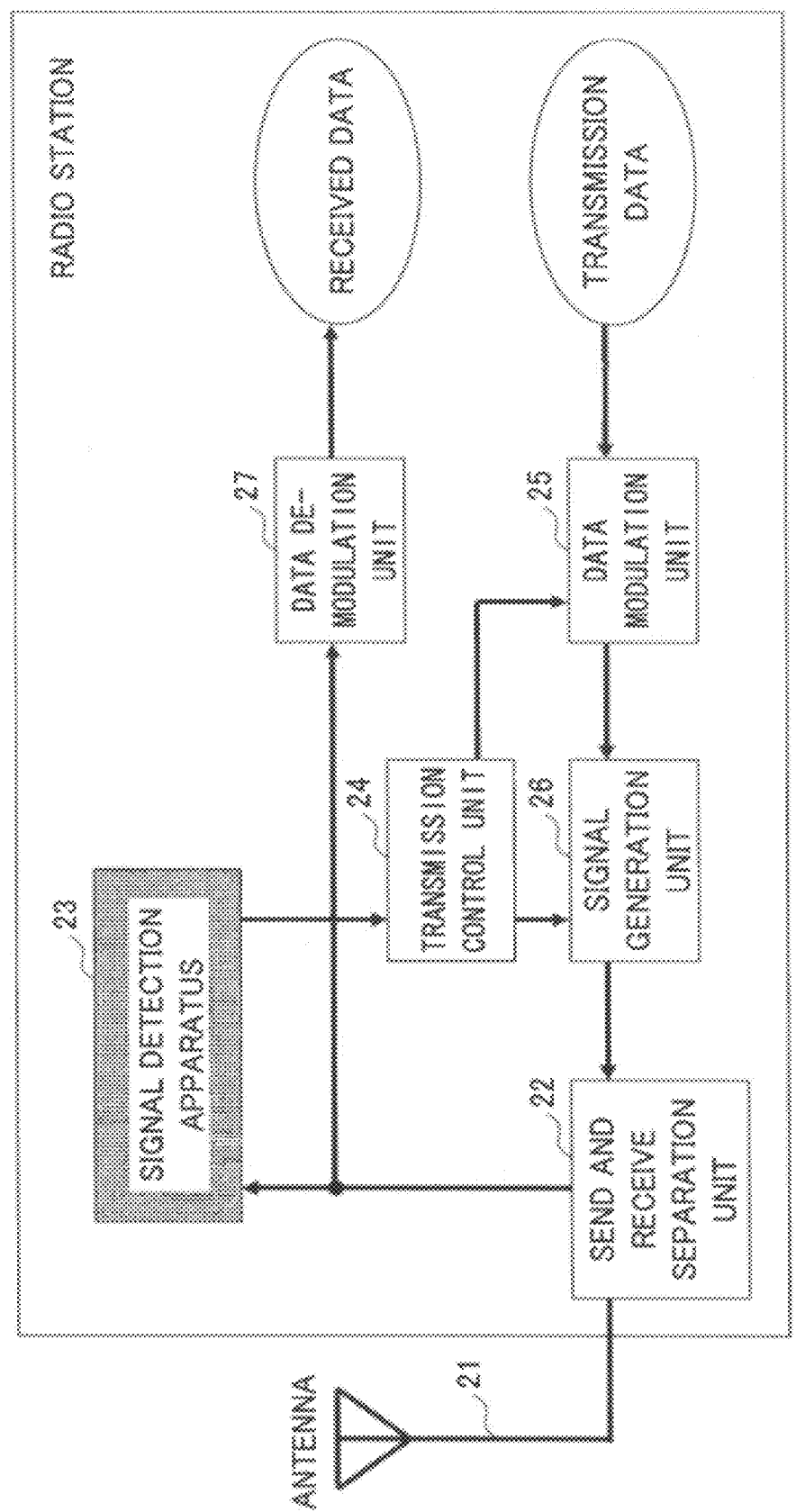
FIG. 2 is a functional block diagram of a radio station.

FIG. 2 shows a radio station according to an embodiment of the present invention. The radio station can be used at least as the radio stations A and A' shown in FIGS. 1A and 1B. Further, the radio station shown in FIG. 2 may be used as one of the radio stations B, B', C and C'. The radio station may be any proper communication apparatus that can perform radio communication. For example, the radio station may be a user apparatus, an information terminal, a smart phone, a personal digital assistant, a mobile personal computer, a mobile phone or a fixed terminal or the like.

The radio station includes an antenna 21, a send and receive separation unit 22, a signal detection apparatus 23, a transmission control unit 24, a data modulation unit 25, a signal generation unit 26 and a data demodulation unit 27. FIG. 2 shows units especially related to the present embodiment in various functional components provided in the radio station.

The signal supplied to the antenna 21 of the radio station is supplied to the signal detection apparatus 23 via the send and receive separation unit 22. As described below, the signal detection apparatus 23 determines whether a detection target signal is included in a received signal. One or more detection target signals exist. The transmission control unit 24 determines availability of signal transmission based on the result of detection by the signal detection apparatus 23. When transmission of a signal is available, the transmission control unit 24 determines parameters and the like used for transmission (data modulation scheme, channel coding rate, frequency resource block, transmission power and the like). The determined parameters are reported to the data modulation unit 25.

The transmission data transmitted from the radio station is modulated by the data modulation unit 25, and is converted to a radio signal by the signal generation unit 26. As is obvious for a person skilled in the art, in reality, not only data modulation, but also processing such as channel coding and interleaving and the like is performed. According to the transmission availability information and the parameters reported from the transmission control unit 24, the generated transmission signal is transmitted from the antenna 21 via the send and receive separation unit 22, so that the signal arrives at a correspondent radio station.

After the radio station starts communication with the correspondent radio station, a signal received from the antenna 21 is demodulated by the data demodulation unit 27, so that received data from the correspondent radio station can be obtained (in reality, not only data demodulation, but also channel decoding and data interleaving and the like are performed).

<3. Waveform Feature Amount>

The signal detection apparatus shown in FIG. 2 calculates a waveform feature amount for a detection target signal when determining whether the detection target signal is included in the signal received by the antenna 21. The waveform feature amount is information indicating statistical characteristics of the signal waveform. The signal detection apparatus may use, as the waveform feature amount, cyclostationarity obtained from a second-order cyclic autocorrelation value, a dispersion value of signal amplitude, frequency correlation value and the like. In the following, the waveform feature amount is described.

The signal waveform is determined based on various parameters such as center frequency, frequency bandwidth, transmission power, modulation scheme, and transmission information symbol and the like. Therefore, the signal waveform includes features of the above-mentioned parameters. For example, in the cases of the patent document 1 and the non-patent document 2, the value of the cyclic autocorrelation function (CAF) is calculated, so that presence or absence of the signal is detected based on the feature amount of cyclostationarity. In this case, a characteristic is utilized in which the value of the cyclic autocorrelation function of a signal becomes large only when a specific parameter is used for calculation of the cyclic autocorrelation value due to modulation scheme and the like used for the signal. Also, in Japanese Laid-Open Patent Application No. 2008-061214 (to be referred to as patent document 2), a method is proposed for providing different feature amounts of cyclostationarity for signals on which the same modulation scheme is used. These are merely examples, and the feature amount representing the characteristics of the signal waveform can be represented from various viewpoints such as correlation value and statistical value of the signal, and the like.

Figure 3:
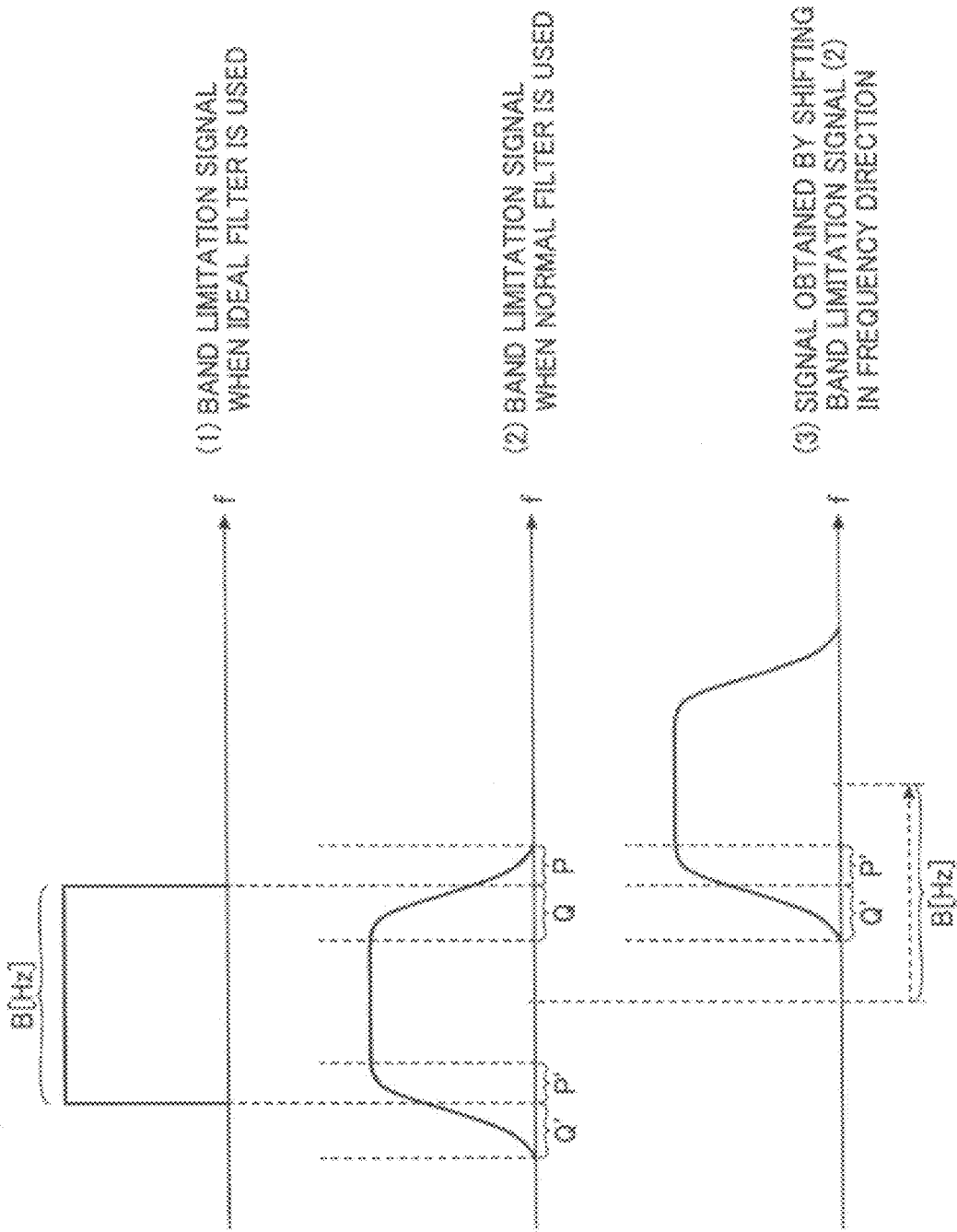
FIG. 3 is a diagram for explaining an example of a waveform feature amount.

FIG. 3 is a diagram for explaining the feature amount of cyclostationarity caused by effects of a filter, as an example of the waveform feature amount of the signal. (1) of FIG. 3 shows a frequency spectrum of a signal of a bandwidth B [Hz] in which band limitation is performed using an ideal filter. When using an ideal filter, the frequency spectrum can be made to be a rectangle. However, in reality, it is difficult to realize such a spectrum. When band limitation is performed by using an actual filter, a frequency spectrum having a slope that is gentle to some extent can be obtained. (2) of FIG. 3 shows a frequency spectrum when performing band limitation using a normal realistic filter. As shown in (2) of FIG. 3, compared to the case in which the ideal filter is used, the frequency band expands by P and Q' when using the actual band limitation filter. In the expanded frequency bands, the area shown by P expanding to the right side has a signal component the same as that of an area shown by P' in the left side. And also, the area shown by Q' expanding to the left side has a signal component the same as that of an area shown by Q in the right side. Therefore, a part of P' in a signal (3) that is obtained by shifting the signal (2) of FIG. 3 by B [Hz] is the same as the signal component of the part of P of (2), and a part of Q' in a signal (3) is the same as a signal component of the part of Q of (2). Therefore, a correlation value between the waveform of (2) and the waveform of (3) indicates a high value.

Accordingly, as to the signal in which band limitation is performed by a filter, correlation (cyclic autocorrelation) occurs between the signal and a signal obtained by frequency-shifting the signal. The correlation value can be used as a waveform feature amount. In the example shown in the figure, correlation between a signal and a signal obtained by shifting the signal in the frequency direction is considered. In the same way, it can be considered to shift the signal in a time direction. Therefore, in general, the amount indicating periodicity is referred to as "cyclic parameter", and the amount for shifting is referred to as "shift parameter". In the present embodiment, a test statistic (described later) that becomes a criteria for determining presence or absence of a signal is calculated by using the correlation value, so as to determine whether a detection target signal is included in a received signal.

Other than the cyclostationarity derived by calculating a correlation value between a signal and a shifted signal obtained by shifting the signal in a direction, there is a statistic that can be used as the waveform feature amount. A dispersion value of signal amplitude, that is, second order cumulant is an example of such a statistic. In general, the second order cumulant corresponds to a dispersion of values that the amplitude can take. For example, values of the second order cumulant are largely different between a signal such as a signal of the OFDM scheme in which peak to average power ratio (PAPR) is very high and a constant envelope signal such as a signal of the single-carrier scheme or noise. The dispersion in the former signal is large since the signal takes various amplitude values, and the dispersion in the latter signal is relatively small. By utilizing such properties, it is also possible to detect whether an OFDM signal is included in the received signal.

Other than the cyclostationarity and the second order cumulant, frequency correlation characteristics of a signal can be also used as a statistic usable for the waveform feature amount (refer to IEEE 802.22 Working Group of the LAN MAN Standards Committee,"IEEE P802.22/D0.1 Draft Standard for Wireless Regional Area Networks Part 22: Cognitive Wireless RAN Medium Access Control(MAC) and Physical Layer(PHY) specifications: Policies and procedures for operation in the TV bands", The Institute of Electrical and Electronics Engineers, May 2006, at this point). In the case of the frequency correlation characteristics, a bias of signal power is applied to subcarrier frequency component of a multicarrier signal such as OFDM, and the radio station including a control apparatus according to the present invention calculates a frequency correlation value of the received signal, so that the radio station can detect a value of the peak, the number of peaks, frequency interval between peaks or the like as the waveform feature amount.

As mentioned above, the waveform feature amount indicating a statistical feature of the signal waveform may be based on a correlation value of a signal, and may be based on a statistic such as dispersion. However, for the sake of convenience of explanation, a waveform feature amount represented by second order cyclic autocorrelation function (CAF) is used in the following description.

<4. Principle of Embodiment of the Present Invention>

Figure 4:
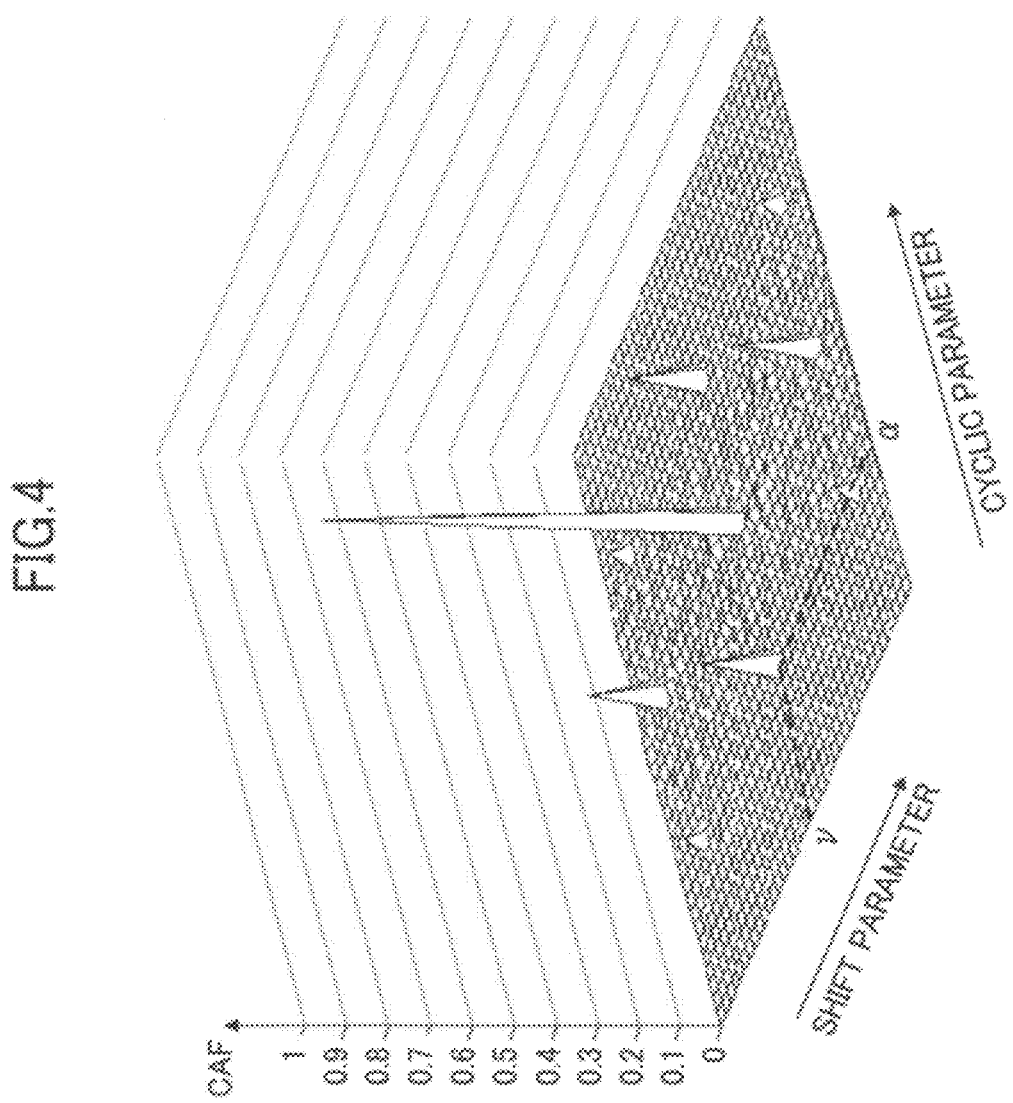
FIG. 4 is a diagram showing a calculation example of a cyclic autocorrelation value.

FIG. 4 shows a calculation example of the cyclic autocorrelation value (CAF) in various cyclic parameters (cyclic frequencies) and various shift parameters (shift amounts). In the example shown in the figure, although a cyclic autocorrelation value (CAF) at coordinates (a,v) specified by a cyclic parameter and a shift parameter is shown, the present embodiment can be expanded to a greater number of dimensions. The cyclic autocorrelation value (CAF) indicates a high correlation value in the case where a particular cyclic frequency and a particular shift amount are used, and indicates only a low error component in the case of other cyclic frequencies and shift amounts.

As mentioned later, when determining whether a particular detection target signal exists in the received signal, a test statistic for the particular detection target signal is calculated, and presence or absence of the particular detection target signal is determined according to whether the test statistic exceeds a threshold value. For calculating the test statistic, it is necessary to calculate various cyclic autocorrelation values (CAF). More particularly, it is necessary to calculate L cyclic autocorrelation values including a cyclic autocorrelation value at a cyclic frequency and a shift amount $(\alpha_0, v_0)$ of the particular detection target signal. Therefore, when the number of candidates of the detection target signals is N, it is necessary to calculate N×L cyclic autocorrelation values. Although all of these N×L cyclic autocorrelation values are calculated in the conventional method, it is not necessary to calculate all of these in the present embodiment.

Figure 5:
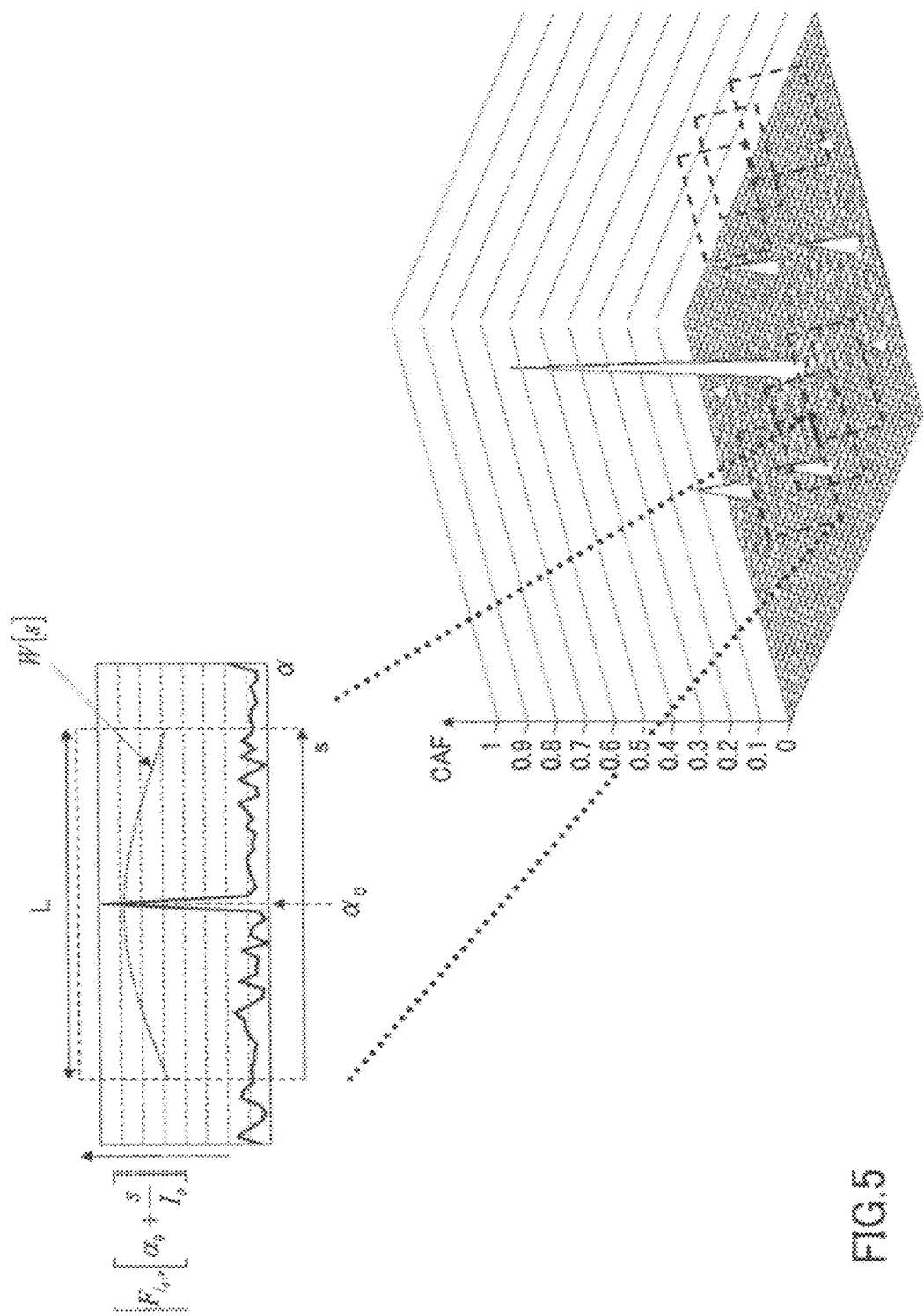
FIG. 5 is a diagram showing a manner for calculating L cyclic autocorrelation values for each candidate of detection target signal.

FIG. 5 schematically shows a manner in which L cyclic autocorrelation values are calculated for each of 6 detection target signals. One dashed-line box corresponds to L cyclic autocorrelation values for one detection target signal. In the figure, the top-left section shows a manner in which L cyclic autocorrelation values for one detection target signal are plotted. The vertical axis indicates absolute values of the cyclic autocorrelation values, and the horizontal axis shows cyclic frequencies. In the figure, although the cyclic autocorrelation values appear to change continuously with respect to cyclic frequency, L calculated values are arranged discretely in reality. The shift amount is fixed to a specific value $(v_1)$. W[s] indicates a filtering function included in after-mentioned equations, and a cyclic autocorrelation value is multiplied by W[s] when calculating a test statistic.

Figure 6:
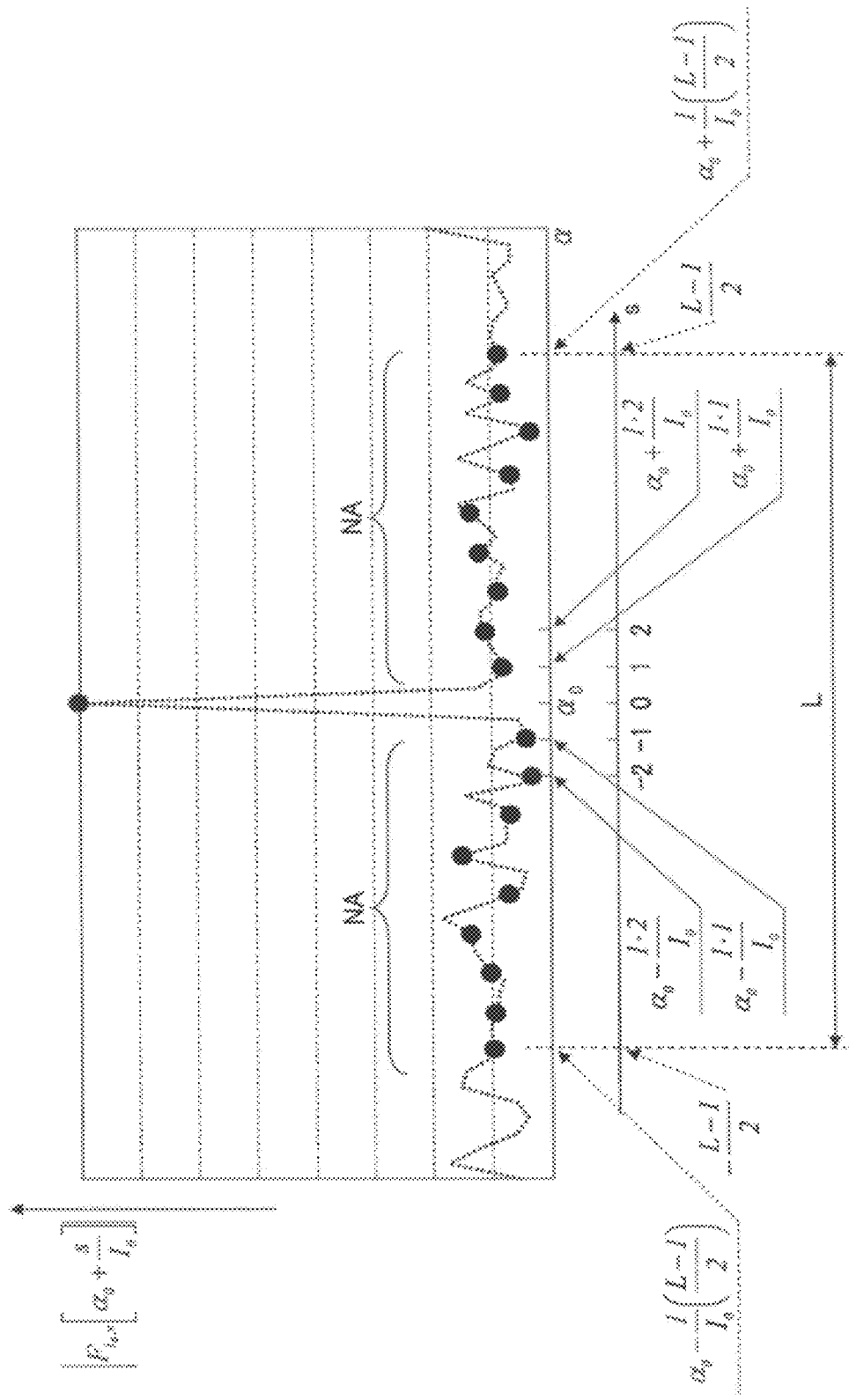
FIG. 6 is a diagram showing the L cyclic autocorrelation values in detail.

FIG. 6 is a diagram showing L cyclic autocorrelation values shown in the top-left section of FIG. 5 in detail. Although FIG. 6 shows only 19 points (black circles) in order to emphasize that the cyclic autocorrelation values are plotted discretely, many points exist in reality. The horizontal axis shows cyclic frequencies. The vertical axis shows absolute values of the cyclic autocorrelation values. More specifically, the vertical axis indicates $$F_{I_0,v}(\alpha_0+s/I_0)=\Sigma_{(t=0-I_0-1)}x(t)\cdot x(t+v)\cdot \exp(j2\pi(\alpha_0+s/I_0)).  \quad (5)$$

In this equation, $I_0$ indicates the number of observed samples. As described later, a relationship of $R_x^\alpha(v)=(1/I_0) F_{I_0,v}(\alpha)$ holds true between the cyclic autocorrelation value and the above-mentioned function $F_{I_0,v}$. As long as there is no fear of confusion, each of $R_x^\alpha$ and $F_{I_0,v}$ is also called "cyclic autocorrelation value". The cyclic frequency $\alpha$ takes the following L values.

$$\alpha_0 - ((L-1)/2)/I_0,$$
$$\ldots$$
$$\alpha_0 - 2/I_0,$$
$$\alpha_0 - 1/I_0,$$
$$\alpha_0,$$
$$\alpha_0 + 1/I_0,$$
$$\alpha_0 + 2/I_0,$$
$$\ldots$$
$$\alpha_0 + ((L-1)/2)/I_0$$

In the L values, since $\alpha_0$ is a cyclic frequency of the detection target signal, the cyclic autocorrelation value at $\alpha=\alpha_0$ indicates a high value (peak). Each cyclic autocorrelation value in a section of $\alpha \neq \alpha_0$ only indicates a value of a low error component. The error component is mainly caused by interference component due to other signals of $\alpha \neq \alpha_0$, fading in radio propagation environment, thermal noise of the receiver and the like. The error component in the area where no peak exists, shown as "NA" in the figure, comes close to zero as the number $I_0$ of samples observed in signal processing becomes larger. Also, variation of the error component comes close to normal distribution as the number $I_0$ of samples becomes larger. Such a property of the error component does not depend on respective detection target signals. Rather, the property is common to all areas where there is no peak. Inventors of the present application focus on this point. That is, $(L-1)$ cyclic autocorrelation values other than the center coordinate point (peak) are commonalized for plural detection target signals when obtaining L cyclic autocorrelation values so as to reduce calculation load in signal detection.

Figure 7:
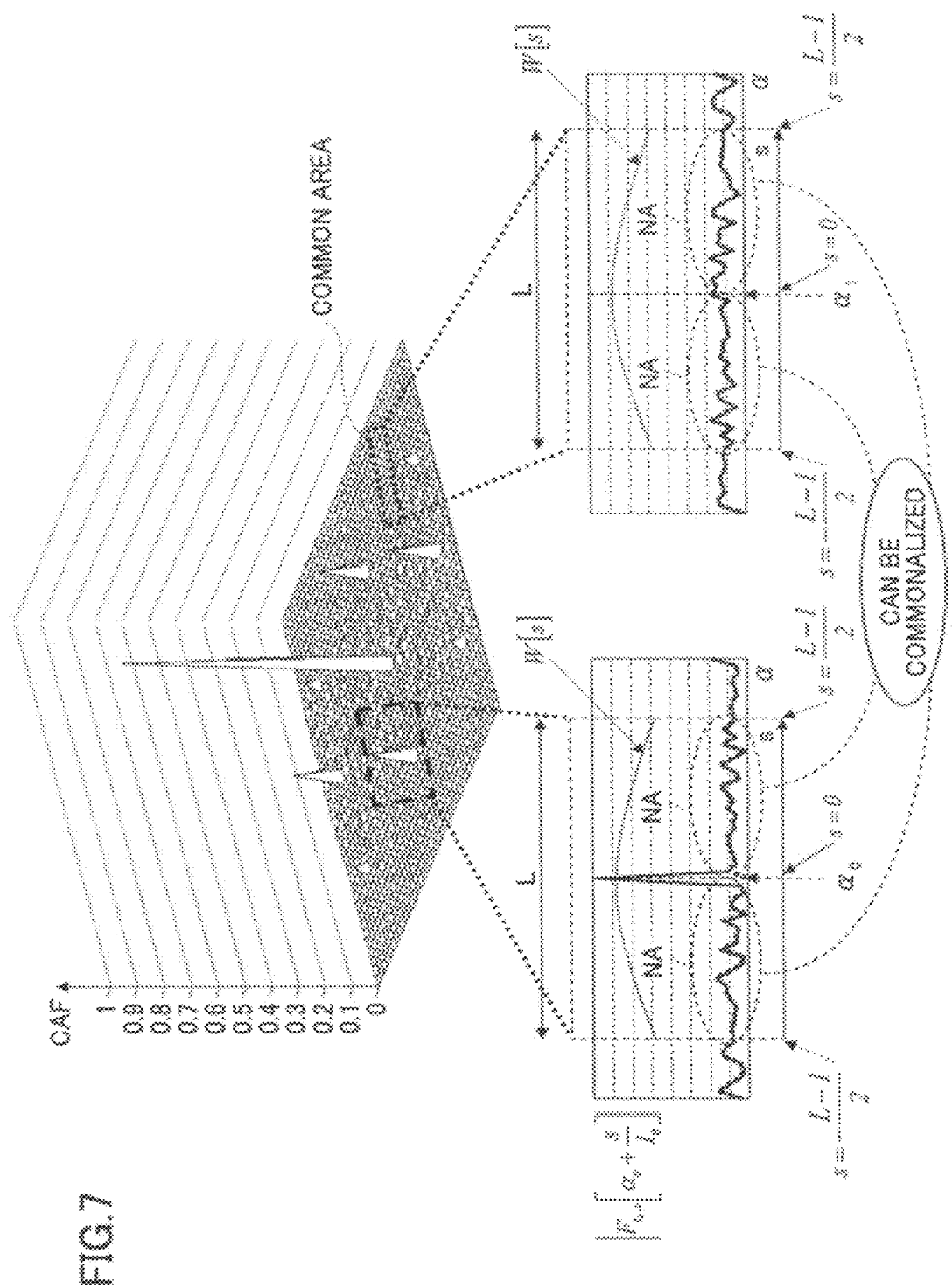
FIG. 7 is a diagram for explaining the principle of an embodiment of the present invention.

FIG. 7 shows a manner in which $(L-1)$ cyclic autocorrelation values other than the center coordinate point $(\alpha_0, v_0)$ are commonalized for plural detection target signals when obtaining L cyclic autocorrelation values. In the example shown in the figure, the number of times of calculation of the cyclic autocorrelation values is $(L+1)$, that is a sum of $(L-1)$ times for $(L-1)$ coordinate points in the area of NA, 1 time in the coordinate point of $\alpha=\alpha_0$, and 1 time in the coordinate point of $\alpha=\alpha_1$. In the case of the conventional method, the cyclic autocorrelation value is calculated L times for a detection target signal in which the cyclic frequency is $\alpha_0$, and the cyclic autocorrelation value is calculated L times for a detection target signal in which the cyclic frequency is $\alpha_1$. Thus, the number of times of calculation becomes 2 L. Since L is in a range between several tens and several hundreds in ordinary cases, the number of times of calculation can be largely reduced according to the present embodiment. But, the value of L is not limited to the range.

In the following, equations that are used for later explanation are shown. The second order cyclic autocorrelation function (CAF) for a received radio signal (received signal) x(t) is represented by the following equation (1).

$$R_x^\alpha(\tau) = \lim_{I_0 \to \infty} \frac{1}{I_0} \int_0^{I_0} x(t)x^*(t+\tau)e^{-j2\pi\alpha t}dt \quad (1)$$

In the equation, * indicates complex conjugate, $I_0$ indicates an observing time length, $\alpha$ indicates a cyclic parameter representing a cyclic frequency, and $\tau$ indicates a shift parameter representing a lag parameter.

Generally, when $\alpha \neq 0$, if the cyclic autocorrelation function (CAF) $R_x^\alpha(\tau) \neq 0$, the signal x(t) has cyclostationarity.

Also, a discrete time representation of the equation (1) is as follows.

$$R_x^\alpha[v] = \frac{1}{I_0} \sum_{i=0}^{I_0-1} x[i]x^*[i+v]e^{-j2\pi\alpha i T_s} \quad (2)$$

In the equation, $I_0$ indicates the number of samples corresponding to the observing time length, $\alpha$ indicates a cyclic parameter representing a cyclic frequency, and v is a shift parameter representing the discrete time representation of the lag parameter. Also, $x[i] \equiv x(iT_s)$ holds true, in which $T_s$ indicates a sampling cycle.

Regarding the cyclic autocorrelation value (CAF) of the equation (2), the following equation (3) holds true for an estimation value $\sim R_x^\alpha(v)$, a true value $R_x^\alpha(v)$, and an estimation error $\Delta_x^\alpha(v)$.

$$\tilde{R}_x^\alpha(v)=R_x^\alpha(v)+\Delta_x^\alpha(v) \quad (3)$$

In the case when the number $I_0$ of observed samples is large enough, the estimation error $\Delta_x^\alpha(v)$ becomes 0. Further, variation of the estimation error $\Delta_x^\alpha(v)$ follows normal distribution in the case when the number $I_0$ of observed samples is large enough.

A peak of the cyclic autocorrelation function (CAF) occurs when v=0 for a cyclic frequency $\alpha$. Thus, assuming that a cyclic frequency of a detection target signal that is possibly included in the received signal x(t) is $\alpha_0$, a 1×2 type vector (candidate vector) is defined as follows, in which a cyclic autocorrelation value (CAF estimation value) (v=0) in the cyclic frequency $\alpha_0$ is a vector component.

$$\tilde{r}_x^{\alpha_0}=r_x^{\alpha_0}+\Delta_x^{\alpha_0} \quad (4)$$

$$\tilde{r}_x^{\alpha_0}=[Re\{\tilde{R}_x^{\alpha_0}(0)\}, Im\{\tilde{R}_x^{\alpha_0}(0)\}] \quad (5)$$

$$r_x^{\alpha_0}=[Re\{R_x^{\alpha_0}(0)\}, Im\{R_x^{\alpha_0}(0)\}] \quad (6)$$

$$\Delta_x^{\alpha_0}=[Re\{\Delta_x^{\alpha_0}(0)\}, Im\{\Delta_x^{\alpha_0}(0)\}] \quad (7)$$

In the equations, Re{ } and Im{ } represents a real part and an imaginary part of an argument respectively.

<5. Signal Detection Apparatus>

Figure 8:
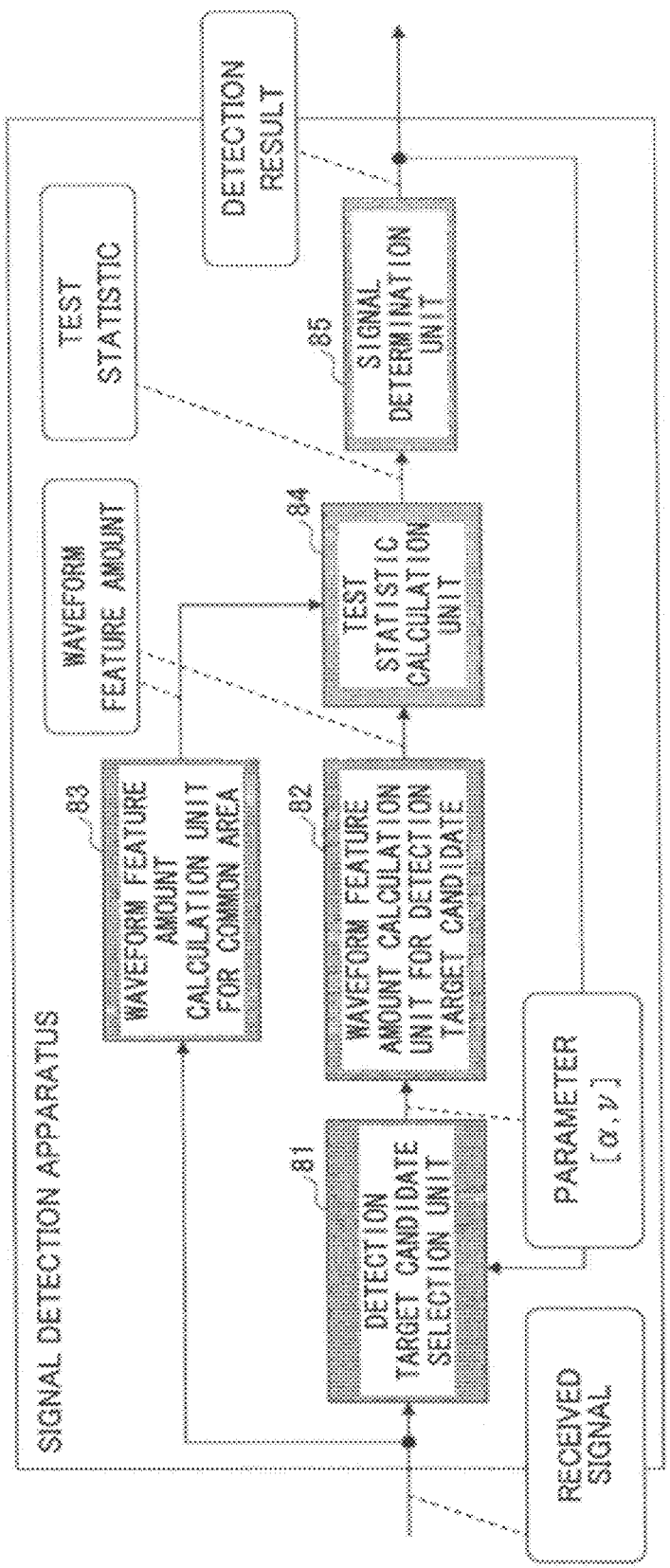
FIG. 8 is a diagram showing details of a signal detection apparatus.

FIG. 8 shows details of the signal detection apparatus. The signal detection apparatus can be used as the signal detection apparatus 23 in the radio station shown in FIG. 2. The signal detection apparatus includes a detection target candidate selection unit 81, a waveform feature amount calculation unit 82 for detection target candidate, a waveform feature amount calculation unit 83 for common area, a test statistic calculation unit 84 and a signal determination unit 85.

The detection target candidate selection unit 81 selects a particular detection target signal from among candidates of plural N detection target signals that are possibly included in the received signal. The detection target signal includes a feature represented as a predetermined waveform feature amount. In the present embodiment, the waveform feature amount is represented by a value of the cyclic autocorrelation function (CAF). The waveform feature amount is specified by a cyclic frequency and a shift amount ($\alpha,\nu$). The candidates of the N detection target signals have different waveform feature amounts respectively, and have peaks at coordinate points of ($\alpha_0,\nu_0$), ($\alpha_1,\nu_1$), . . . , ($\alpha_{N-1},\nu_{N-1}$) respectively. The coordinate point corresponding to a peak of the cyclic autocorrelation value is called "center coordinate point" for the sake of convenience of explanation.

The waveform feature amount calculation unit 82 for detection target candidate calculates a cyclic autocorrelation value ($F_{f0,\nu0}(\alpha_0)$) at the center coordinate point ($\alpha_0,\nu_0$) corresponding to a selected particular detection target signal.

The waveform feature amount calculation unit 83 for common area calculates the cyclic autocorrelation value for each of (L−1) coordinate points belonging to the common area commonly used for the N detection target signals. The common area is an area where no peak exists for the N detection target signals, in which only error component exists. It is assumed that the signal detection apparatus already knows cyclic frequencies and shift amounts defining the common area at least at the time when calculating the waveform feature amount. How the receiver (signal detection apparatus) knows the common area is described later.

For example, (L−1) coordinate points belonging to the common area are set as follows for the sake of convenience of explanation:

$$(\alpha_1',\nu_1'), (\alpha_2',\nu_1'), \ldots, (\alpha_{L-1}',\nu_1').$$

The shift amount $\nu_1'$ is not necessarily constant in the (L−1) coordinate points. It should be noted that the coordinate point ($\alpha_1,\nu_1$) in the N detection target signals is different from and is not related to the coordinate point ($\alpha_1',\nu_1'$) in the common area. In each of the (L−1) coordinate points, the following cyclic autocorrelation value is calculated.

$$F_{f0,\nu1'}(\alpha_1'), F_{f0,\nu1'}(\alpha_2'), \ldots, F_{f0,\nu1'}(\alpha_{L-1}')$$

The (L−1) cyclic autocorrelation values calculated by the waveform feature amount calculation unit 83 for common area are commonly used for N detection target signals. Therefore, after presence or absence of a detection target signal ($\alpha_0, \nu_0$) of a current subject is determined, the same (L−1) cyclic autocorrelation values are used for determining presence or absence of another detection target signal ($\alpha_1, \nu_1$). In the following description, although 0 is used as $\nu_0$ (that is, $\nu_0=0$) for the sake of simplicity, generality is not lost.

The test statistic calculation unit 84 calculates a test statistic by using a cyclic autocorrelation value calculated by the waveform feature amount calculation unit 82 for detection target candidate and (L−1) cyclic autocorrelation values calculated by the waveform feature amount calculation unit 83 for common area. The test statistic is an amount used when determining whether a detection target signal is included in the received signal. Therefore, the test statistic can be represented by various amounts. For example, as a detection statistic, a value of waveform feature amount in a specific parameter (especially, cyclic frequency) may be used. Or, as described in the following, a value derived from a covariance $\Sigma_x^\alpha$ including contributions of various waveform feature amounts and a specific waveform feature amount may be used as a test statistic. In the present embodiment, as an example, the following test statistic $Z_x^{\alpha 0}$ is used.

$$Z_x^{\alpha 0} = I_0 \tilde{r}_x^{\alpha 0} (\tilde{\Sigma}_x^{\alpha 0})^{-1} (\tilde{r}_x^{\alpha 0})' \tag{8}$$

In the equation (8), $\sim r_x^{\alpha 0}$ indicates the above-mentioned candidate vector, and ( )' indicates transposition. In the equation (8), $\sim\Sigma_x^{\alpha 0}$ indicates an estimation value of covariance matrix of the candidate vector, and is calculated by the following equations.

$$\tilde{\Sigma}_x^{\alpha_0} = \begin{bmatrix} \mathrm{Re}\left\{\frac{Q+Q^{(*)}}{2}\right\} & \mathrm{Im}\left\{\frac{Q-Q^{(*)}}{2}\right\} \\ \mathrm{Im}\left\{\frac{Q+Q^{(*)}}{2}\right\} & \mathrm{Re}\left\{\frac{Q^{(*)}-Q}{2}\right\} \end{bmatrix} \tag{9}$$

$$Q = S_{f_0,0}^{2\alpha_0}(\alpha_0) \tag{10}$$

$$Q^{(*)} = S_{f_0,0}^{0,(*)}(-\alpha_0) \tag{11}$$

$$\lim_{I_0 \to \infty} I_0 \mathrm{cum}(\tilde{R}_x^\alpha(\nu), \tilde{R}_x^\beta(\rho)) = S_{f_\nu,p}^{\alpha+\beta}(\beta) \tag{12}$$

$$\lim_{I_0 \to \infty} I_0 \mathrm{cum}(\tilde{R}_x^\alpha(\nu), (\tilde{R}_x^\beta(\rho))^*) = S_{f_\nu,p}^{\alpha-\beta,(*)}(-\beta) \tag{13}$$

$$S_{f_\nu,p}^\alpha(\omega) = \lim_{I_0 \to \infty} \frac{1}{I_0} \sum_{i=0}^{I_0-1} \sum_{\xi=-\infty}^{\infty} \mathrm{cum}(f_\nu[i], f_\rho[i+\xi]) \cdot e^{-j2\pi\omega\xi} e^{-j2\pi\alpha i T_s} \tag{14}$$

$$S_{f_\nu,p}^{\alpha,(*)}(\omega) = \lim_{I_0 \to \infty} \frac{1}{I_0} \sum_{i=0}^{I_0-1} \sum_{\xi=-\infty}^{\infty} \mathrm{cum}(f_\nu[i], f_\rho^*[i+\xi]) \cdot e^{-j2\pi\omega\xi} e^{-j2\pi\alpha i T_s} \tag{15}$$

$$\tilde{Q} = \tilde{S}_{f_0,0}^{2\alpha_0}(\alpha_0) = \frac{1}{I_0 L} \sum_{s=-(L-1)/2}^{(L-1)/2} W(s) \times F_{I_0,0}\left(\alpha_0 - \frac{s}{I_0}\right) F_{I_0,0}\left(\alpha_0 + \frac{s}{I_0}\right) \tag{16}$$

$$\tilde{Q}^{(*)} \tilde{S}_{f_0,0}^{0,(*)}(-\alpha_0) = \frac{1}{I_0 L} \sum_{s=-(L-1)/2}^{(L-1)/2} W(s) \times F_{I_0,0}^*\left(\alpha_0 + \frac{s}{I_0}\right) F_{I_0,0}\left(\alpha_0 + \frac{s}{I_0}\right) \tag{17}$$

In the equations, $$F_{T,\tau}(\omega) = \sum_{t=0}^{T-1} x(t) x^*(t+\tau) \exp(-j2\pi\omega t)$$

holds true.

Also, in the equations, cum( ) indicates cumulant, and $f_\nu[i]=x[i]\cdot x[i+\nu]$ holds true. W(s) indicates a normalized spectrum window, and L is an odd number.

When calculating the test statistic $Z_x^{\alpha 0}$, $\sim r_x^{\alpha 0}$ can be obtained from the cyclic autocorrelation value $F_{I0,0}(\alpha_0) = I_0 R_x^{\alpha 0}(0)$ at the center coordinate point ($\alpha_0$, 0). Matrix elements of $\Sigma_x^{\alpha 0}$ are represented by Q and $Q^{(*)}$, and L cyclic autocorrelation values are necessary for calculating Q and $Q^{(*)}$. For example, according to the equation (16), $$I_0 \cdot L \cdot Q = W(0) \cdot F_{I_0,0}(\alpha_0) \cdot F_{I_0,0}(\alpha_0) +$$
$$W(+1) \cdot F_{I_0,0}(\alpha_0 - 1/I_0 \cdot 1) \cdot F_{I_0,0}(\alpha_0 + 1/I_0 \cdot 1) +$$
$$W(-1) \cdot F_{I_0,0}(\alpha_0 + 1/I_0 \cdot 1) \cdot F_{I_0,0}(\alpha_0 - 1/I_0 \cdot 1) +$$

-continued $$W(+2) \cdot F_{I0,0}(\alpha_0 + 1/I_0 \cdot 2) \cdot F_{I0,0}(\alpha_0 - 1/I_0 \cdot 2) +$$
$$W(-2) \cdot F_{I0,0}(\alpha_0 + 1/I_0 \cdot 2) \cdot F_{I0,0}(\alpha_0 - 1/I_0 \cdot 2) + \ldots + W(+(L-1)/2) \cdot$$
$$F_{I0,0}(\alpha_0 - 1/I_0 \cdot (L-1)/2) \cdot F_{I0,0}(\alpha_0 + 1/I_0 \cdot (L-1)/2) +$$
$$W(-(L-1)/2) \cdot F_{I0,0}(\alpha_0 + 1/I_0 \cdot (L-1)/2) \cdot F_{I0,0}(\alpha_0 - 1/I_0 \cdot (L-1)/2)$$

holds true.

In the conventional method, this is directly calculated. On the other hand, in the present embodiment, this is not calculated directly. Instead, (L−1) cyclic autocorrelation values in the case of $\alpha \neq \alpha_0$ are replaced with calculated (L−1) cyclic autocorrelation values $F_{I0,0}(\alpha_1')$, $F_{I0,0}(\alpha_2')$, ..., $F_{I0,0}(\alpha_{L-1}')$ in the common area.

That is, $$I_0 \cdot L \cdot Q = W(0) \cdot F_{I0,0}(\alpha_0) \cdot F_{I0,0}(\alpha_0) +$$
$$W(+1) \cdot F_{I0,0}(\alpha_1') \cdot F_{I0,0}(\alpha_2') + W(-1) \cdot F_{I0,0}(\alpha_2') \cdot F_{I0,0}(\alpha_1') +$$
$$W(+2) \cdot F_{I0,0}(\alpha_3') \cdot F_{I0,0}(\alpha_4') + W(-2) \cdot F_{I0,0}(\alpha_4') \cdot F_{I0,0}(\alpha_3') +$$
$$\ldots + W(+(L-1)/2) \cdot F_{I0,0}(\alpha_{L-2}') \cdot F_{I0,0}(\alpha_{L-1}') +$$
$$W(-(L-1)/2) \cdot F_{I0,0}(\alpha_{L-1}') \cdot F_{I0,0}(\alpha_{L-2}')$$

is calculated. Also, $Q^{(*)}$ by equation (17) is similarly calculated as follows.

$$I_0 \cdot L \cdot Q^{(*)} = W(0) \cdot F_{I0,0}(\alpha_0) \cdot F_{I0,0}(\alpha_0) +$$
$$W(+1) \cdot F_{I0,0}(\alpha_1') \cdot F_{I0,0}(\alpha_1') + W(-1) \cdot F_{I0,0}(\alpha_2') \cdot F_{I0,0}(\alpha_2') +$$
$$W(+2) \cdot F_{I0,0}(\alpha_3') \cdot F_{I0,0}(\alpha_3') + W(-2) \cdot F_{I0,0}(\alpha_4') \cdot F_{I0,0}(\alpha_4') +$$
$$\ldots + W(+(L-1)/2) \cdot F_{I0,0}(\alpha_{L-2}') \cdot F_{I0,0}(\alpha_{L-2}') +$$
$$W(-(L-1)/2) \cdot F_{I0,0}(\alpha_{L-1}') \cdot F_{I0,0}(\alpha_{L-1}')$$

Accordingly, the covariance matrix $\Sigma_x^\alpha$, and eventually the test statistic $Z_x^{\alpha 0}$ can be calculated by using the cyclic autocorrelation value $F_{I0,0}(\alpha_0)$ in the center coordinate point and (L−1) cyclic autocorrelation values $F_{I0,0}(\alpha_1')$, $F_{I0,0}(\alpha_2')$, ..., $F_{I0,0}(\alpha_{L-1}')$ in the common area.

The signal determination unit 85 compares the value $Z_x^{\alpha 0}$ of test statistic obtained by the test statistic calculation unit 84 with a predetermined threshold $\Gamma$ so as to determine whether a detection target signal (signal for which cyclic frequency is $\alpha_0$) is included in the received signal. The determination may be performed using a statistical test method such as "likelihood ratio test" and "generalized likelihood ratio test (GLRT)". These test methods utilize a property that distribution of test statistics in the case when the detection target signal is not arriving follows a chi-square distribution.

Figure 9:
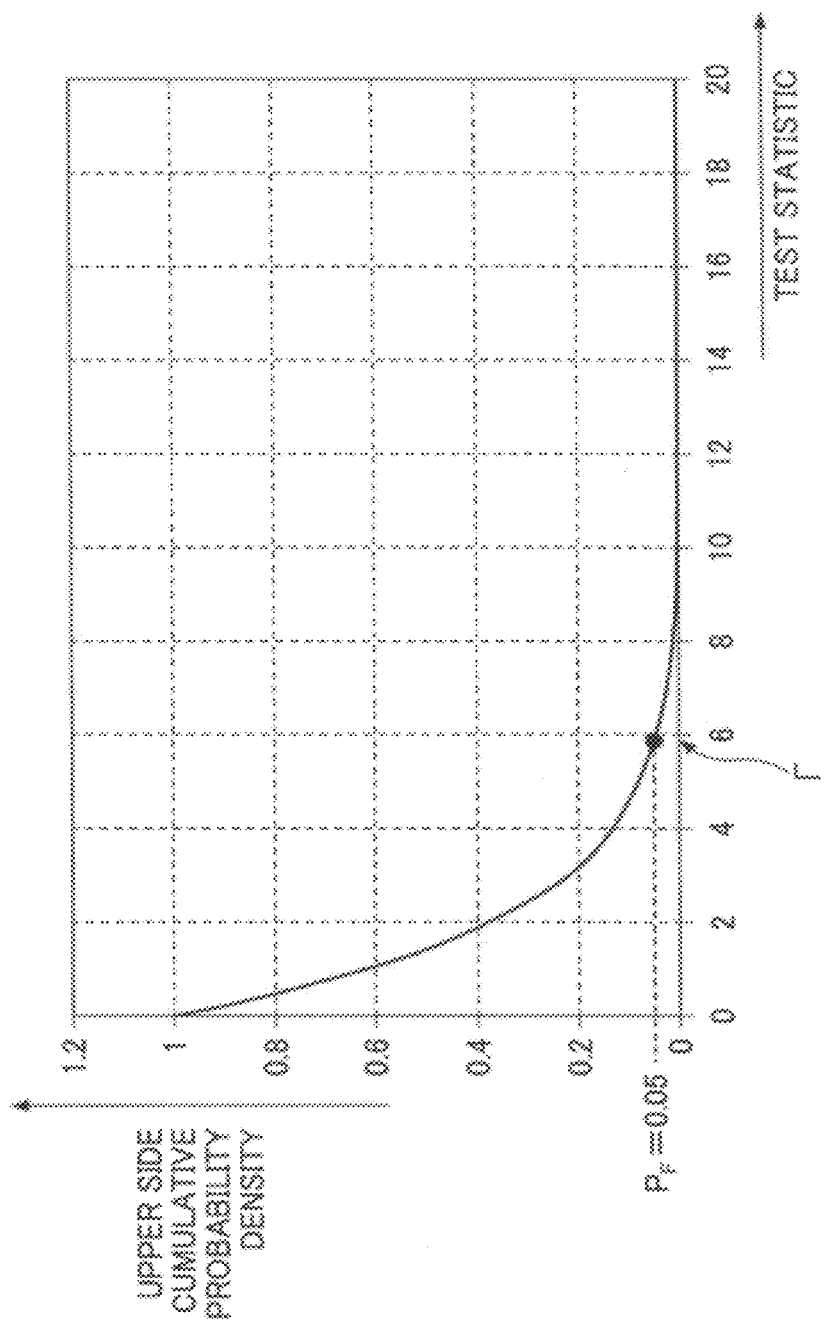
FIG. 9 is a diagram showing relationship between probability density function and test statistic on the case in which a signal is not arriving.

FIG. 9 shows a method for determining a threshold in a test in order to keep a probability to be constant in which it is erroneously determined that the detection target signal is included even though the detection target signal is not included in the received signal. Assuming that the level of significance is 5% (0.05), the value of the variable following the chi-square distribution corresponding to the upper side accumulated probability is 5.99≈6. This means that, when the threshold in the test is $\Gamma$=6, the probability $P_F$ in which it is erroneously determined that "signal is arriving" even though the signal is not arriving becomes 5%. When the test statistic $Z_x^\alpha$ is equal to or greater than the threshold $\Gamma$, since the probability in which erroneous decision occurs is less than 5%, it can be determined that the detection target signal is included in the received signal. On the contrary, when the test statistic $Z_x^\alpha$ is less than the threshold $\Gamma$, since the probability in which erroneous decision occurs is greater than 5%, it can be determined that the detection target signal is not included in the received signal. It is not essential that the threshold value corresponds to 5%, and a proper value may be used according to circumstances.

The signal output from the signal determination unit 85 indicates a detection result showing presence or absence of the detection target signal. Thus, by referring to the signal, the transmission control unit 24 (FIG. 2) can properly determine whether to send a transmission signal.

<6. Operation Example>

Figure 10:
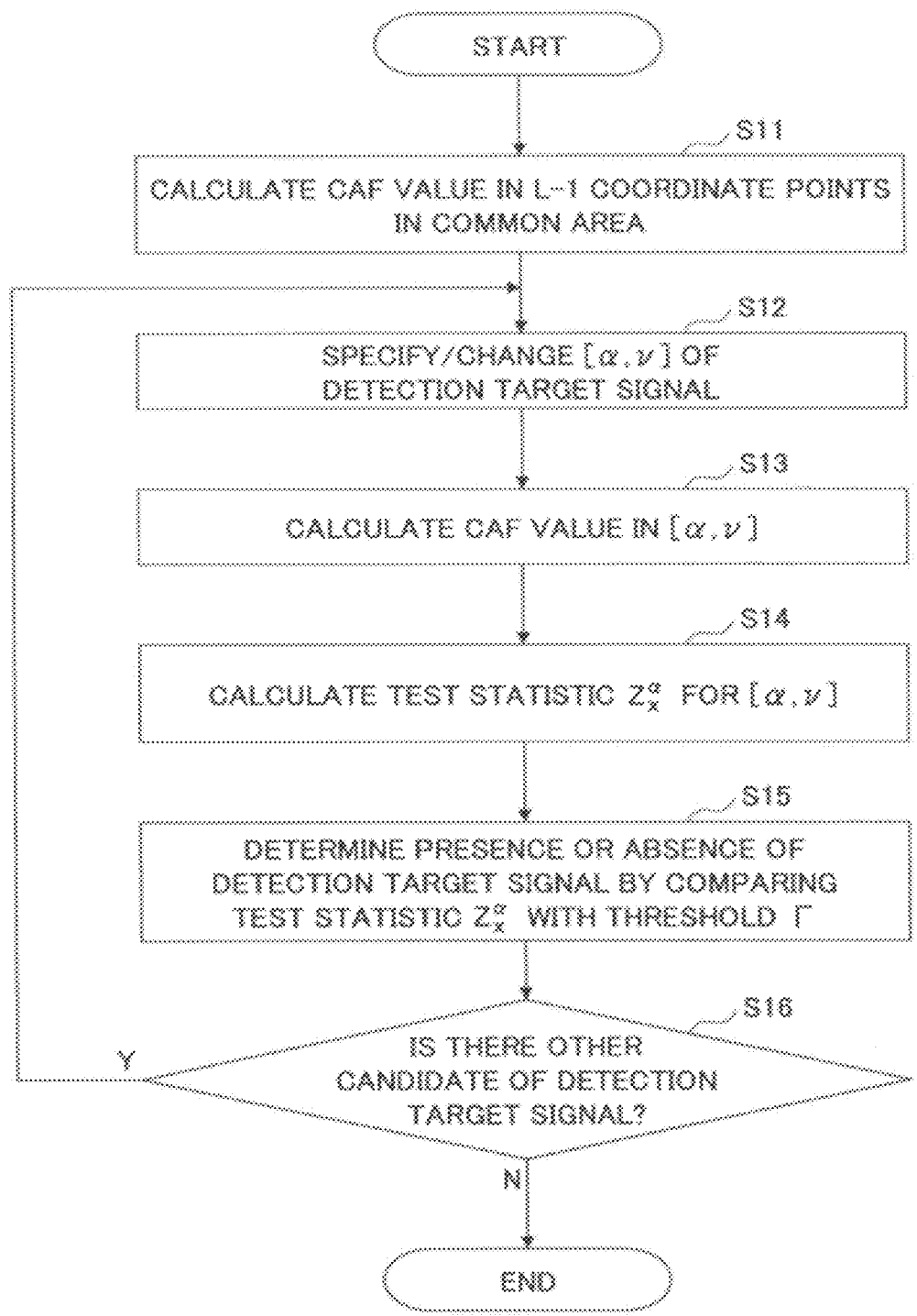
FIG. 10 is a flowchart of an operation example in the signal detection apparatus.

FIG. 10 shows a flowchart of an operation example in the signal detection apparatus. This operation example is used by the signal detection apparatus (FIG. 8) of the radio station (FIG. 2). As a precondition of the flow, the radio station is receiving a signal. There is a possibility that the received signal includes N types of detection target signals. As mentioned above, it is assumed that the common area includes (L−1) coordinate points of $(\alpha_1', v)$, $(\alpha_2', v)$, ..., $(\alpha_{L-1}', v)$. Although the shift parameter v is constant, this is not essential.

In step S11, the waveform feature amount calculation unit 83 for common area calculates the cyclic autocorrelation values $F_{I0,v}(\alpha_1')$, $F_{I0,v}(\alpha_2')$, ..., $F_{I0,v}(\alpha_{L-1}')$ for (L−1) coordinate points belonging to the common area respectively.

In step S12, the detection target candidate selection unit 81 specifies a particular detection target signal in N detection target signals. More particularly, a cyclic frequency and a shift amount (α, v) of the particular detection target signal are specified.

In step S13, the waveform feature amount calculation unit 82 for detection target candidate calculates a cyclic autocorrelation value $F_{I0,v}(\alpha)$ in the center coordinate point (α, v).

In step S14, the test statistic calculation unit 84 calculates a test statistic $Z_x^\alpha$ for the particular detection target signal. The test statistic calculation unit 84 uses (L−1) cyclic autocorrelation values $F_{I0,v}(\alpha_1')$, $F_{I0,v}(\alpha_2')$, ..., $F_{I0,v}(\alpha_{L-1}')$ calculated by the waveform feature amount calculation unit 83 for common area, as cyclic autocorrelation values in (L−1) coordinate points that are different from the center coordinate point (α, v) in an area including the center coordinate point (α, v). Specific calculation is performed according to the above-mentioned equations (8)-(17).

In step S15, the signal determination unit 85 determines presence or absence of the particular detection target signal according to a result of comparison between the test statistic $Z_x^\alpha$ and the threshold $\Gamma$.

In step S16, it is determined whether there is an unexamined detection target signal. If there is no unexamined detection target signal, the flow ends.

In step S16, when there is an unexamined detection target signal, the flow returns to step S12, and the cyclic frequency α and the shift amount v that are currently set are changed into ones of a detection target signal for which presence or absence is determined next. In this case, since the flow returns to step S12, it should be noted that the process of step S11 is not repeated while determining presence or absence of N detection target signals. The calculation results (L−1 cyclic autocorrelation values) in step S11 are commonly used for determining presence or absence of N detection target signals. After the determination of presence or absence of N detection target signals ends, if it becomes necessary to determine presence or absence of N detection target signals again, the flow starts again, so that processes after S11 are performed.

<7. Modified Example>

As mentioned above, the information indicating where the common area, in which there is no peak of detection target signal, exists may be reported to the receiver by a transmitter (that is a base station typically) in a communication system to which the receiver belongs. For example, when the receiver enters the communication system, the receiver may obtain the information of the common area from system information reported by the base station. Or, the information of the common area may be set as known information in a communication system to which the receiver belongs. In this case, the information of the common area is stored in a memory of the receiver beforehand.

Instead of receiving the report of the common area, or in addition to that, it is possible that the receiver searches for the common area. For example, the receiver calculates the cyclic autocorrelation value (CAF) for an observation length of a very long time period, then, an area where only cyclic autocorrelation values which do not exceed a predetermined threshold exist may be set as the common area.

Each time when presence or absence of N detection target signals is determined by using the common area that is set by using a method, variation of (L−1) cyclic autocorrelation values in the common area is checked, so that it can be determined whether the area used as the common area is truly appropriate for a common area. If the area is truly the common area, variation of (L−1) cyclic autocorrelation values should come close to normal distribution. On the other hand, if the variation of (L−1) cyclic autocorrelation values do not come close to the normal distribution, the area is not appropriate for a common area. From this viewpoint, how cyclic autocorrelation values (CAF) in an area of a range (of cyclic frequencies and shift amounts) change may be checked for a time period, so that an area causing a variation close to normal distribution may be set as a common area.

<8. Effects of Embodiment>

<8.1 Effect of Reduction of Calculation Load>

The number of times of calculation of the cyclic autocorrelation value exerts a dominant influence when calculating the test statistic. According to the equations (2) and (8)-(17), calculation of the test statistic $Z_x^\alpha$ includes: (A) calculation of cyclic autocorrelation values (CAF or F) by the equation (2); (B) calculation of covariance matrix $\Sigma_x^\alpha$ by the equations (9)-(17); and (C) calculation of test statistic $Z_x^\alpha$ by the equation (8).

(A) According to the equation (2), when calculating the cyclic autocorrelation value, it is necessary to repeat shifting the received signal x by v and calculating complex conjugate, multiplying the signal by a factor of cyclic frequency $\alpha$ ($I_0$ times), and multiplying the signal by the received signal, in which addition is performed $I_0$ times and multiplication is performed $I_0$ times. $I_0$ indicates the number of observed symbols. As mentioned above, when calculating the cyclic autocorrelation value, it is necessary to perform addition and multiplication $I_0$ order of times. As an example, $I_0$ is 320 (effective part of 256 symbols+guard interval of 64 symbols)×3 (over-sampling of 3 times)×48 (observing length)= 46080.

(B) According to equations (9)-(17), when calculating matrix elements of covariance matrix, it is necessary to obtain L kinds of cyclic autocorrelation values F, to multiply the cyclic autocorrelation value by spectrum window coefficient W(s) (L times), to multiply a product of F and W by an inversion of F and calculate the total sum (addition is L times and multiplication is L times), to multiply a product of F and W by complex conjugate of F and calculate the total sum (addition is L times and multiplication is L times), and to calculate 4 matrix elements from Q and Q(*). Accordingly, for the calculation of the covariance matrix, it is necessary to perform multiplication and addition L order of times. For example, L is a number of several dozen such as 63.

(C) When calculating test statistic, it is necessary to calculate inverse matrix of the covariance matrix, to multiply the vector by the inverse matrix of the covariance matrix, and to multiply the result by conjugate transpose vector of the vector.

Therefore, in (A)-(C), the number of times of addition and multiplication for calculating the cyclic autocorrelation is overwhelmingly large. Thus, when obtaining the test statistic, calculation load for calculating the cyclic autocorrelation value is predominantly large. According to the present embodiment, since the number of times of calculation of the cyclic autocorrelation value can be largely reduced, the calculation load when calculating the test statistic for the detection target signal can be reduced. Speaking broadly, the calculation load of the present embodiment is about (N+L−1)/(N×L) of the calculation load of the conventional method. Thus, the larger N becomes, the larger the effect of reduction of calculation amount becomes.

Figure 11B:
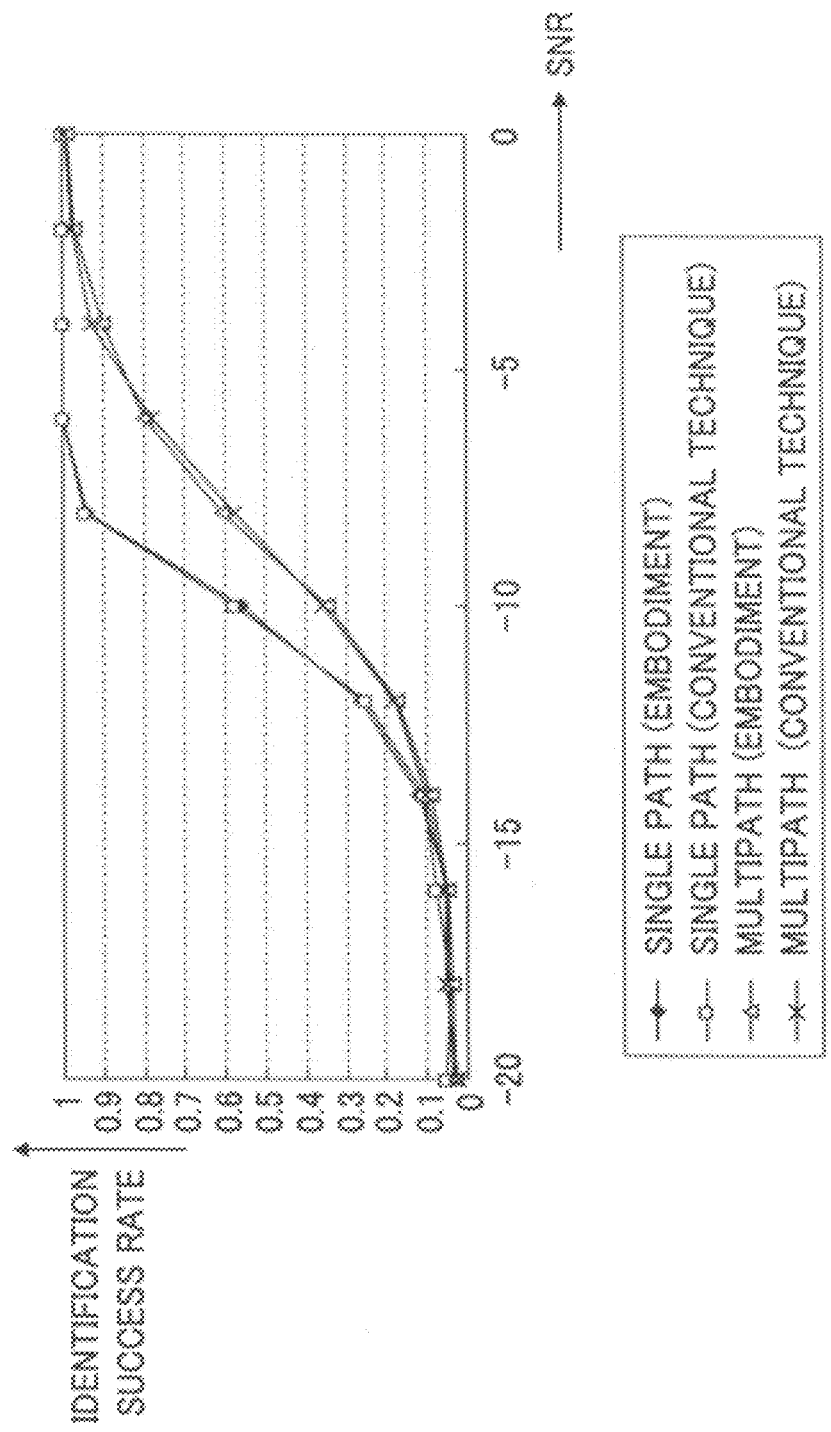

FIGS. 11A and 11B show a simulation result for the present embodiment. In the simulation, as shown in FIG. 11A, it is assumed that the number of candidates of detection target signals is N=8, the number of detection target signal arriving at one time is 1, the observation length is 48 symbols ($I_0$=48× (the number of samples per unit symbol)), and L=63. Also, it is assumed the signals of N=8 are signals of the OFDM scheme, and have peaks in different coordinate points ($\alpha$, v). In FIG. 11B, the horizontal axis indicates reception quality (signal to noise ratio: SNR), and the vertical axis indicates identification success rate. The identification success rate represents probability for succeeding identification of the signal. Broadly speaking, as the reception quality (horizontal axis) improves, the identification success rate increases.

The mark ♦ shows a result when the present embodiment is used in a radio propagation environment where only a single path exists. The mark ■ shows a result when the conventional scheme is used in a radio propagation environment where only a single path exists. In both of the cases, similar results have been obtained. The mark ▲ shows a result when the present embodiment is used in a radio propagation environment where there is a multipath. The mark × shows a result when the conventional scheme is used in a radio propagation environment where there is a multipath. In both of the cases, similar results have been obtained.

As mentioned above, the ratio of calculation load between the present embodiment and the conventional scheme becomes (the present embodiment)/(conventional scheme)= (N+L−1)/(N×L), in which the larger N becomes, the larger the effect of reduction of calculation amount becomes. In the current example, the ratio becomes (8+63−1)/(8×63)≈1/7, which indicates that calculation amount is reduced largely. In the present embodiment, the calculation time is 280 seconds. Since the calculation time of the conventional scheme is 1300 seconds, the radio of the calculation time becomes 280/1300≈1/5. As evidenced this result, according to the present embodiment, the calculation time can be reduced largely.

Therefore, according to the present embodiment, the identification success rate equivalent to the conventional scheme in which calculation load is large can be achieved with small calculation load in a short time.

<8.2 Effect of Improvement of Weak Signal Detection Rate>

In the case when determining presence or absence of the detection target signal by the conventional scheme, if two kinds of signals included in the received signal are received with different powers, there is a problem in that a weak signal is hard to be detected.

Figure 12A:
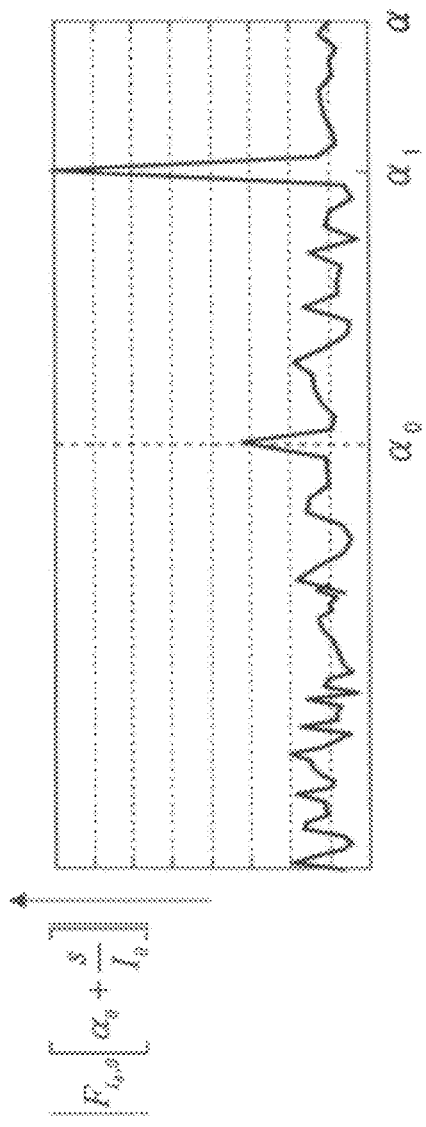
FIGS. 12A and 12B are diagrams for explaining an effect of the present embodiment.
Figure 12B:
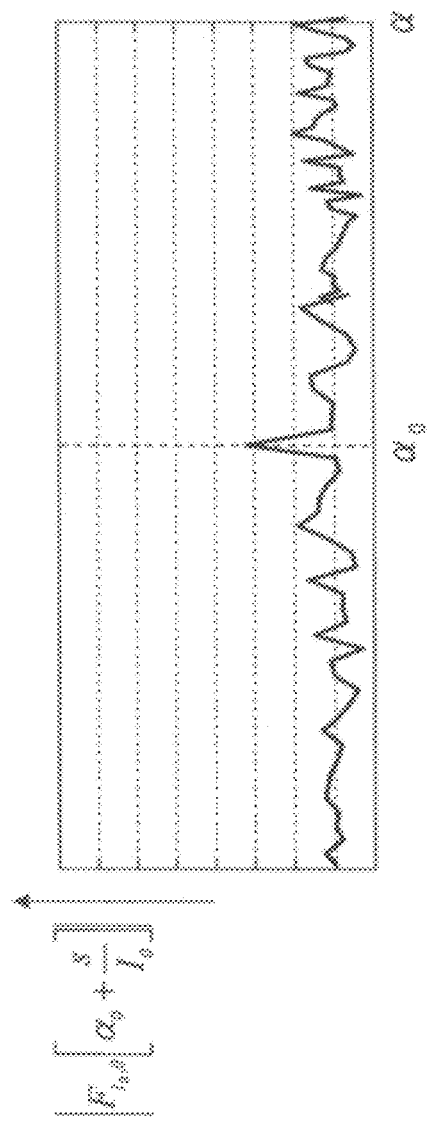

As shown in FIG. 12A, there is a case in which a detection target signal having a cyclic frequency $\alpha_0$ is a weak reception level, and another signal having a cyclic frequency $\alpha_1$ is a strong reception level. In the case of the conventional scheme, when calculating the test statistic of the detection target signal of cyclic frequency $\alpha_0$, the signal of $\alpha_1$ greatly influences calculation of Q and $Q^{(*)}$, so that the test statistic becomes small and the detection rate decreases. On the other hand, according to the present embodiment, since the cyclic autocorrelation values in the common area are used as cyclic autocorrelation values in the area of $\alpha \neq \alpha_0$, any signal other than the detection target signal of $\alpha_0$ is not mixed in the calculation of the test statistic. Therefore, according to the present embodiment, the test statistic can be properly obtained in an ideal situation shown in FIG. 12B. Thus, even if the reception level of the detection target signal is weaker than other signals, detection rate of the signal does not decrease.

Although the present invention has been described with reference to specific embodiments, these embodiments are simply illustrative, and various variations, modifications, alterations, substitutions and so on could be conceived by those skilled in the art. The present invention has been described using specific numerals in order to facilitate understandings of the present invention, but unless specifically stated otherwise, these numerals are simply illustrative, and any other appropriate value may be used. The present invention has been described using specific equations in order to facilitate understandings of the present invention, but unless specifically stated otherwise, these equations are simply illustrative, and any other appropriate equations may be used. Classification into each embodiment or each item is not essential in the present invention, and matters described in equal to or more than two embodiments or items may be combined and used as necessary. Also, a matter described in an embodiment or item may be applied to another matter described in another embodiment or item unless they are contradictory. For convenience of explanation, while the apparatus according to the embodiment of the present invention is explained using functional block diagrams, such an apparatus as described above may be implemented in hardware, software, or a combination thereof. The software may be stored in a storage medium of arbitrary types such as a RAM (Random Access Memory), a flash memory, a ROM (Read Only Memory), an EPROM(Erasable Programmable ROM), an EEPROM(Electronically Erasable and Programmable ROM), a register, a hard disk (HDD), a removable disk and a CD-ROM. The present invention is not limited to the above-mentioned embodiment and is intended to include various variations, modifications, alterations, substitutions and so on without departing from the spirit of the present invention.

The present application claims priority based on Japanese patent application No. 2010-234676, filed in the JPO on Oct. 19, 2010, and the entire contents of the Japanese patent application No. 2010-234676 are incorporated herein by reference.

The invention claimed is:

1. A signal detection apparatus comprising:
    a detection target candidate selection unit configured to select a particular detection target signal from among plural candidates of detection target signals that are possibly included in a received signal;
    a candidate signal calculation unit configured to calculate a cyclic autocorrelation value at a center coordinate point specified by at least a cyclic parameter and a shift parameter of the particular detection target signal;
    a common area calculation unit configured to calculate a cyclic autocorrelation value of each of common coordinate points, each defined by a cyclic parameter and a shift parameter and each belonging to a common area used commonly for different detection target signals;
    a test statistic calculation unit configured to calculate a test statistic of the particular detection target signal; and
    a signal determination unit configured to determine presence or absence of the particular detection target signal according to a comparison result between the test statistic and a threshold,
    wherein the test statistic calculation unit calculates the test statistic by using the cyclic autocorrelation value in each of the common coordinate points belonging to the common area as cyclic autocorrelation values in common coordinate points different from the center coordinate point in an area including the center coordinate point.

2. The signal detection apparatus as claimed in claim 1, wherein each of the cyclic autocorrelation values of the plural detection target signals has a peak in an area other than the common area.

3. The signal detection apparatus as claimed in claim 1, wherein the common area is indicated by information received, from a transmitter, by a receiver including the signal detection apparatus.

4. The signal detection apparatus as claimed in claim 1, wherein the common area is known in a communication system in which a receiver including the signal detection apparatus performs communication.

5. A radio station comprising:
    the signal detection apparatus as claimed in claim 1, and
    a transmission unit configured to transmit a transmission signal by radio when it is determined that the particular detection target signal does not exist by the signal detection apparatus.

6. A signal detection method comprising:
    calculating a cyclic autocorrelation value of each of common coordinate points, each defined by a cyclic parameter and a shift parameter and each belonging to a common area used commonly for different detection target signals;
    selecting a particular detection target signal from among plural candidates of detection target signals that are possibly included in a received signal;
    calculating a cyclic autocorrelation value at a center coordinate point specified by at least a cyclic parameter and a shift parameter of the particular detection target signal;
    calculating a test statistic of the particular detection target signal; and
    determining presence or absence of the particular detection target signal according to a comparison result between the test statistic and a threshold,
    wherein the test statistic is calculated by using the cyclic autocorrelation value in each of the common coordinate points belonging to the common area as cyclic autocorrelation values in common coordinate points different from the center coordinate point in an area including the center coordinate point.

* * * * *